United States Patent [19]

Jenkins et al.

[11] 4,190,014
[45] Feb. 26, 1980

[54] INDUSTRIAL DUST COLLECTOR CLEANING SYSTEM AND METHOD

[76] Inventors: Hugh N. Jenkins, 3555 Duberry Ct., N.E., Atlanta, Ga. 30319; Robert P. Black, 4151 Echo Woods Dr., Clarkston, Ga. 30021

[21] Appl. No.: 916,470

[22] Filed: Jun. 19, 1978

[51] Int. Cl.² ............................................. B01D 46/02
[52] U.S. Cl. ....................................... 116/266; 55/270; 55/341 NT; 55/338; 55/431
[58] Field of Search .................. 55/96, 270, 291, 294, 55/296, 341 R, 341 NT, 302, 338, 431; 15/347, 348, 352; 73/40, 40.7; 116/266, DIG. 25

[56] References Cited

U.S. PATENT DOCUMENTS

| | | | |
|---|---|---|---|
| 2,676,353 | 4/1954 | Maynard | 55/341 NT |
| 3,543,481 | 12/1970 | Pausch | 55/96 |
| 3,960,001 | 6/1976 | Hayes | 55/270 |
| 3,985,527 | 10/1976 | Smithson | 55/341 R |

FOREIGN PATENT DOCUMENTS 903890 12/1953 Fed. Rep. of Germany ............. 55/431

*Primary Examiner*—David L. Lacey
*Attorney, Agent, or Firm*—James A. Hinkle

[57] ABSTRACT

In an industrial dust collector comprising a gas intake dirty air chamber, a filtration clean air chamber, and a set of fabric filter bags mounted within the filtration chamber with the bag interiors in fluid communication with the gas intake chamber having a system for cleaning the filtration chamber which includes a venturi in fluid communication with both chambers to effect cleaning of the collector. A method of cleaning the filtration chamber of an industrial dust collector having fabric filter bags mounted within a filtration chamber with the bag interiors in fluid communication with a gas intake chamber is disclosed comprising the steps of evacuating dust from the filtration chamber and directing the evacuated dust into the gas intake chamber. A method is also disclosed for locating ruptures in the filter bags which comprises the steps of forcing gases from the gas intake chamber into the filtration chamber through the fabric filter bags while simultaneously evacuating dust from the filter chamber exteriorly of the filter bags and directing the evacuated dust from the filtration chamber into the gas intake chamber thereby rendering such ruptures visible to an observer stationed within the filtration chamber.

10 Claims, 7 Drawing Figures

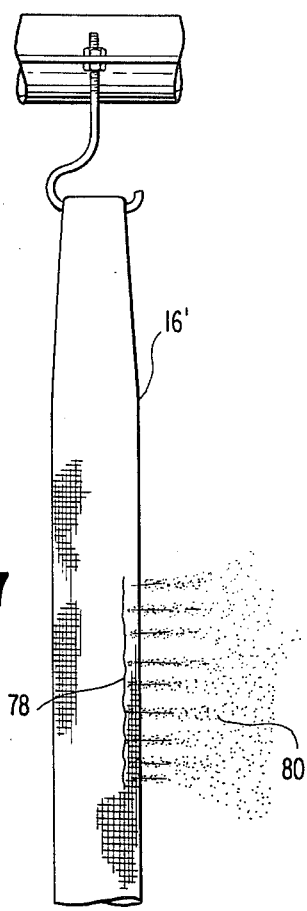
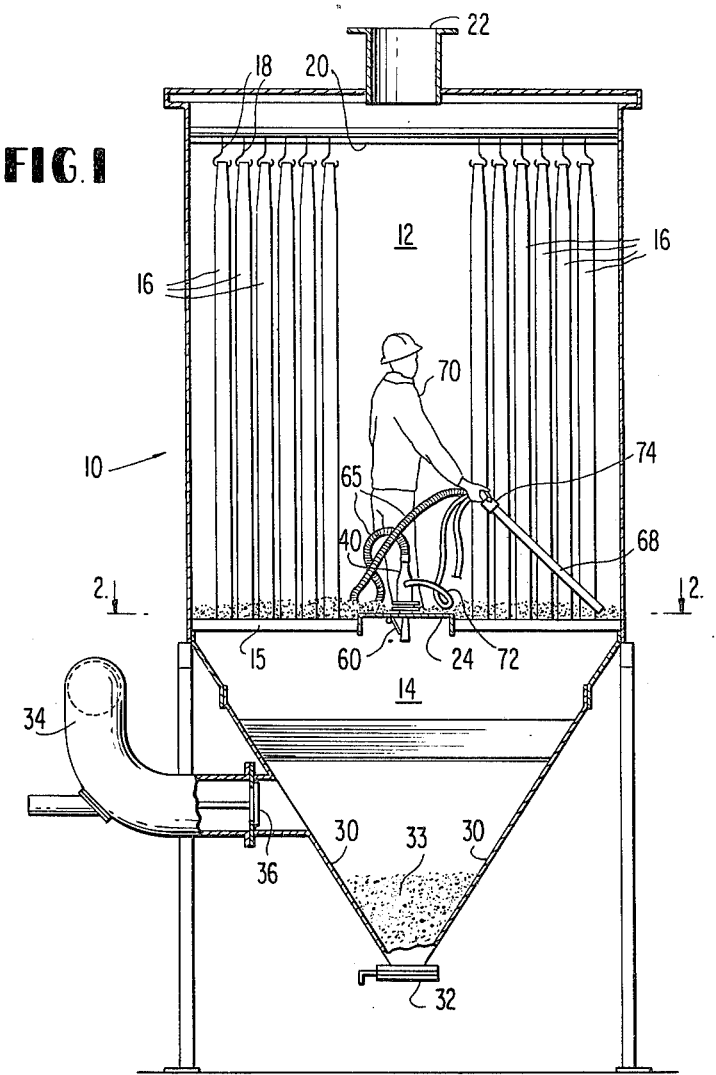
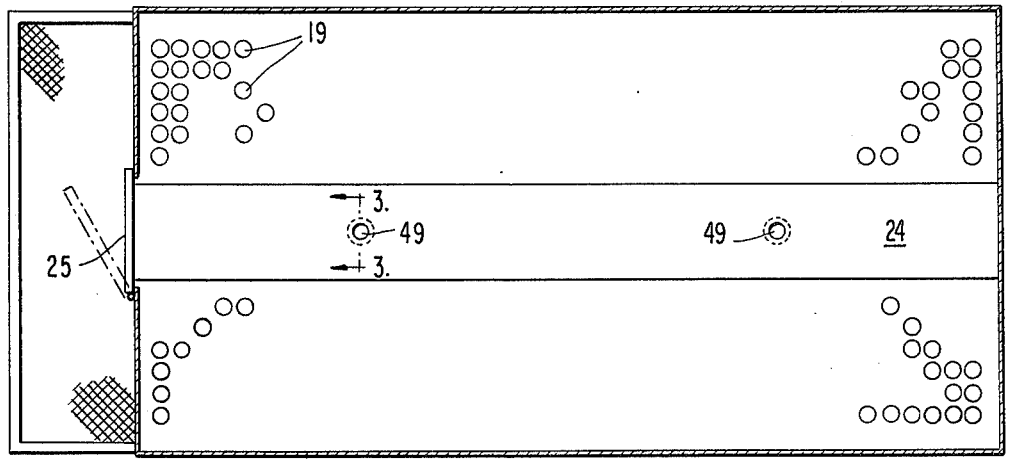

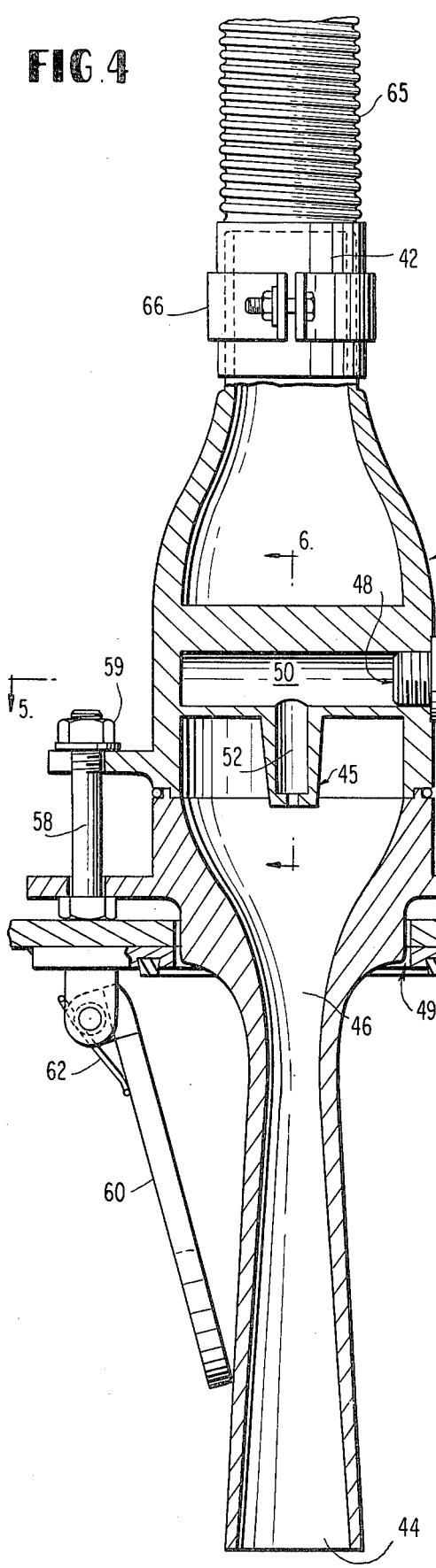
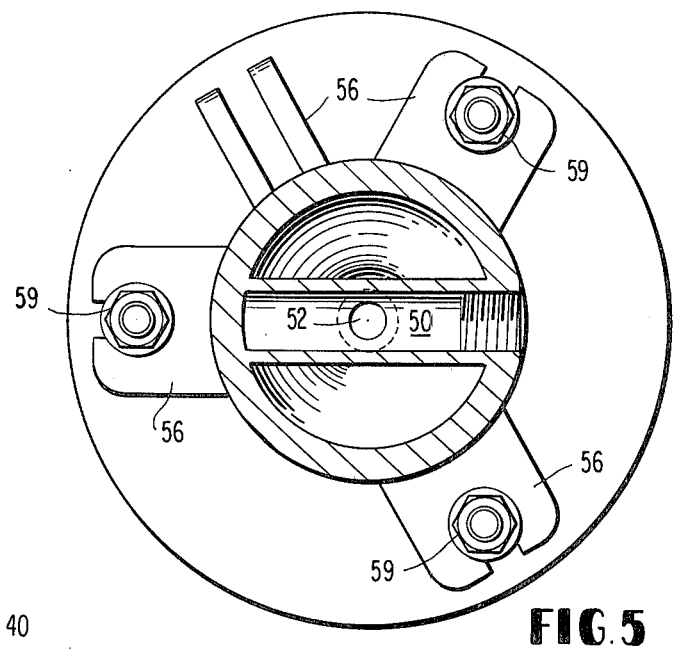
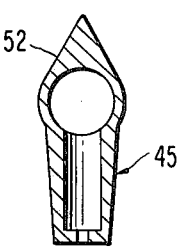
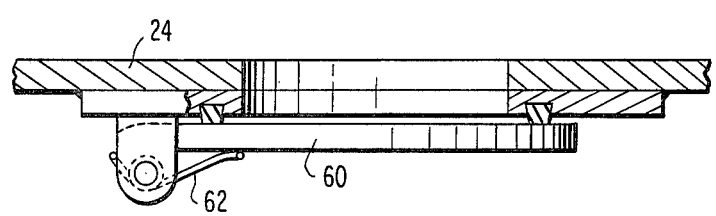

INDUSTRIAL DUST COLLECTOR CLEANING SYSTEM AND METHOD

BACKGROUND OF THE INVENTION

In recent years environment considerations in virtually all industries have dictated that discharge of industrial waste, whether solid, liquid or gas, or combinations thereof, be treated before these wastes are released to the environment. One of the earliest forms of waste to be identified was that of air pollution which may be in the form of virtually any pollutant which is released to the atmosphere. Many industries however must release gases which contain particulates that must be treated in some manner to meet enviornmental quality control standards.

In an environment in which an industry may release dust laden gases, a well known type of device for removing dust particulates from a gaseous stream is that known as an industrial dust collector. Such collectors typically have a filtration or clean air chamber in which rows of fabric filter bags are suspended with a lower end held to the chamber floor over openings through the floor. A gas intake chamber, which may form part of a hopper, is mounted beneath the filtration chamber floor.

The Wheelabrator-Frye Corporation manufactures an industrial dust collector of the type just described which is known as the Wheelabrator Dustube Collector. This type of collector is operated by forcing dust laden gas into the gas intake chamber and then upwardly through the holes in the gas intake chamber ceiling above and into fabric filter bags with the filtration chamber thereabove. The gas is then forced through the filter bags which affects the filtering operation and then out of the filtration chamber to ambient atmosphere. By means of the filtration action of the fabric bags, the particulate matter or dust that is carried by the gas is retained inside the fabric bags to be later deposited into hopper beneath the filtration chamber by agitation of the bags. With the passage of time the fabric filter bags may deteriorate to a point where some particulate matter will commence to pass through the bags and be deposited upon the gas effluent, exterior side thereof. In some cases this is a slow process while in other cases the bag may rupture abruptly.

A second type of dust collector in common usage is a type similar to that just described, however the principle of operation utilizes a system in which the dust is collected on the outside of the filter bags. In this system the bags are prevented from collapsing by means of wire retainer supports. In this case the filter bag is literally, the filter chamber and projects into the gas intake chamber.

Heretofore the gas effluent or clean air sides of the filter bags within the filtration chamber have been ordinarily cleaned manually as by sweeping particulate matter on the bags or on the floor therebeneath into the gas intake chamber and hopper through a sealable opening such as a trap door in the filtration chamber floor. This procedure is not only time consuming, tedious and a very unpleasant task but even one that is dangerous for maintenance personnel. The filtration chambers are ordinarily quite large in which dust may collect from several inches to even several feet in depth. By sweeping the chamber a tremendous amount of dust is stirred up which may be inhaled by the worker unless he is supplied with oxygen tank and mask. In other cases vacuum cleaners have been employed but their use has required the availability of electric power within the filtration chamber. Furthermore, they have also required their own filters and dust storage space which must also be periodically cleaned and the collected dust transferred.

In addition to the foregoing problems, workers have also had to enter the filtration chambers of industrial dust collectors periodically to inspect the condition of the filter bags to determine which, if any, should be replaced due to deterioration or rupture. Because of the hazard of sending workmen into this environment many users have eliminated such inspections by replacing all of the filter bags periodically. This is obviously expensive and wasteful since properly functioning filter bags are replaced by this method along with those in marginal condition.

Accordingly, it is a general object of the present invention to provide an improved system and method for cleaning industrial dust collectors.

More specifically, it is an object of the invention to provide an improved system and method for cleaning the filtration chambers of industrial dust collectors of the type having fabric filter bags mounted within the filtration chambers.

Another object of the invention is to provide an improved means and methods for inspecting fabric filter bags mounted within a filtration chamber of industrial dust collectors.

SUMMARY OF THE INVENTION

In one form of the invention a system is provided for cleaning the filtration chamber of an industrial dust collector of the type having a gas intake chamber, a filtration chamber and fabric filter bags disposed within the filtration chamber with the bag interiors in fluid communication with the gas intake chamber. The system includes means for collecting dust within the filtration chamber and means for directing collected dust from the filtration chamber and into the gas intake chamber.

In another form of the invention as industrial dust collector is provided comprising a gas intake chamber, a filtration chamber, and a set of air filter bags mounted within the filtration chamber with the bag interiors in fluid communication with the gas intake chamber. A system for cleaning the filtration chamber is also provided having a source of compressed air and a venturi having an inlet in fluid communication with the gas intake chamber, and a nozzle between the inlet and outlet in fluid communication with the source of compressed air.

In yet another form of the invention a method is provided for cleaning the filtration chamber of an industrial dust collector having fabric filter bags mounted within the filtration chamber with the bag interiors in fluid communication with a gas intake chamber. The method comprises the steps of evacuating dust from the filtration chamber exterior the filter bags, and directing the evacuated dust into the gas intake chamber.

In still another form of the invention a method is provided for locating ruptures in fabric filter bags mounted in the filtration chamber of industrial dust collectors with the filter bag interiors in fluid communication with the gas intake chamber. The method comprises the steps of forcing gases from the gas intake chamber into the filtration chamber through the fabric filter bags while simultaneously evacuating dust from the filration chamber exteriorily of the filter bags and directing the evacuated dust from the filtration chamber into the gas intake chamber. In this manner evacuated dust may be forced back into the filtration chamber, in which the filter bags are located, and the dust will pass more rapidly through any bag ruptures thereby rendering such ruptures visible to an observer stationed within the filtration chamber.

BRIEF DESCRIPTION OF THE DRAWINGS

FIG. 1 is a side elevational view of an industrial dust collector with a side wall removed to reveal a workman cleaning the collector filtration chamber with the system and method of the present invention.

FIG. 2 is a plan view of the industrial dust collector shown in FIG. 1 with the roof removed to reveal the interior thereof.

FIG. 3 is a side view, partially in cross-section, of a sealable passageway communicating between the filtration and gas intake chambers of the dust collector shown in FIG. 1.

FIG. 4 is a side elevational view, partially in cross-section, of the venturi component of the cleaning system shown in the dust collector of FIG. 1.

FIG. 5 is a cross-sectional view of the venturi shown in FIG. 4 taken along plane 5—5.

FIG. 6 is a cross-sectional view of a portion of the venturi taken along plane 6—6.

FIG. 7 is a side elevation view of a ruptured fabric bag in the filtration chamber of the collector of FIG. 1 observed during an inspection in accordance with a method of the present invention.

DESCRIPTION OF THE PREFERRED EMBODIMENT

Referring now in more detail to the drawing, there is shown a conventional industrial collector 10 having a filtration chamber 12 positioned above a gas intake chamber 14 with a horizontal partition 15 therebetween serving both as a floor for the filtration chamber and as a ceiling of the gas intake chamber. A set of fabric filter bags 16 is suspended from hooks 18 depending from the filtration chamber ceiling 20. The upper ends of the filter bags adjacent to hooks are closed while the lower ends open to passageways 19 through partition 15 shown in FIG. 2. In this manner the filter surfaces of the filter bags are in fluid communication with the gas intake chamber beneath the partition. A flue 22 is mounted to the ceiling of the filtration chamber through which filtered gases may exit to ambient atmosphere. An interior walkway 24 is provided down the center of the filtration chamber with an access door 25 provided at its end through which workers may enter the filtration chamber for maintenance.

With continued reference to FIGS. 1 and 2, the industrial dust collector gas intake chamber 14 is seen to have two inclined side walls 30 which converge downwardly to a slide gate 32. So configured the gas intake chamber serves simultaneously as a hopper for the collection of dust 33 at the bottom thereof atop the slide gate. A gas intake conduit 34 communicates with the interior of the gas intake chamber through a damper valve 36. With this construction it is seen that dust laden gases may enter the gas intake chamber through the intake conduit 34 and damper valve 36 and then be directed upwardly through partition passageways 19 into the interiors of the fabric filter bags 16. From here the gases may pass through the bags, and thereby be filtered, to the exterior of the bags within the filtration chamber 12 and then out into the ambient atmosphere through flue 22.

With reference next to FIGS. 4–6, a system for cleaning the air filtration chamber is seen to include a generally tubular venturi 40 having an inlet 42 at one end thereof and an outlet 44 at the opposite end thereof. Venturi also has a nozzle 45 positioned intermediate the two ends adjacent but upstream from a narrowing venturi neck portion 46. Nozzle 45 communicates with another interior inlet 48 by a transverse passageway 50 and an axially oriented, dependent passageway 52 in communication therewith. As shown in FIG. 6, the leading upstream edge of nozzle 45 is ridged about which air drawn into the venturi through inlet 42 may smoothly flow toward the venturi outlet 44.

The venturi 40 is further seen to be provided with six flange pairs 56 of alternate orientation which hold together structural sections of the venturi by means of bolts 58 and nuts 59. The venturi is seated upon partition 15 with the venturi throat 46 located within and substantially filling one of two passageways 49 through the walkway 24 and with venturi outlet 44 positioned actually within the confines of the gas intake chamber beneath the partition and walkway. In this position the venturi inself holds open an access door 60 which is biased by a spring 62 normally to a position closing the passageway through the walkway. Thus under normal operating conditions door 60 substantially seals off the filtration chamber from the gas intake chamber. During a filtration chamber cleaning operation, however, the venturi is set upon walkway 24 with its outlet position in the gas intake chamber holding door 60 in its open position. Flexible suction hose 65 may then be coupled to the venturi inlet 42 by a clamp 66 and a wand 68 mounted to the end of the flexible hose distal of the venturi which may be held by a worker 70 during the cleaning operation. Finally, an air hose 72 is coupled to inlet 48 which communicates with nozzle 45 which air hose is connected to an unshown source of compressed air through a valve 74 mounted on the hand grip of wand 68.

In performing a cleaning operation damper valve 36 is closed and a workman 70 enters filtration chamber 12 through access door 25. He may then mount venturi 40 in a passageway 49 through walkway 24 which urges that passageway door 60 to its open position. With air hose 65 coupled to a pressurized air intake and valve 74 actuated, the workman may move about the filtration chamber as illustrated in FIG. 1 placing the open end of wand 68 to dust collected on the exterior of bags 16 and to dust previously deposited on the chamber floor when the filter bags are periodically vibrated in cleaning their interiors. By manual operation of valve 74 compressed air is drawn into the venturi through nozzle 45 and urged out of the venturi opening outlet 44. In passing through venturi throat 46, a low pressure is created drawing air and dust in through venturi inlet 66, the flexible air hose 65, and wand 74. The dust is then drawn from the filtration chamber through the venturi and into the gas intake chamber 14. From here it is forced back into the filtration chamber in the interiors of the fabric filter bags 16.

Any ruptures in the bags now also would be recognized due to the passage of dust therethrough. Thus in FIG. 7, a slit 78 is made visible in filter bag 16′ by the presence of dust stream 80 flowing therethrough. This bag may then be replaced with a new filter bag upon completion of the cleaning operation. Once the dust has been removed from the filtration chamber, valve 74 is deactivated and the venturi removed from the passageway through the walkway. The spring-biased door 60 will thereupon close resealing the filtration chamber from the gas intake chamber. The worker may then exit through access door 25 and reopen damper valve 36 and restart normal dust collector operation.

It should be understood that the just described embodiment merely illustrates principles of the invention in a selected, preferred form. Many additions, deletions and other modifications may, of course, be made thereto without departing from the spirit and scope of the invention as set forth in the following claims.

What is claimed is:

1. A system for cleaning the filtration chamber of an industrial dust collector of the type having a gas intake chamber including a gas inlet, a filtration chamber having a clean gas outlet, the filtration chamber being in communication with the gas intake chamber and a plurality of fabric filter bags having filtering surfaces disposed within the filtration chamber wherein the bag filtering surfaces are in fluid communication with the gas intake chamber, said cleaning system including means for collecting dust in said filtration chamber, and means for directing collected dust from said filtration chamber and into said gas intake chamber, and said dust directing means comprising a venturi having a first inlet in fluid communication with said filtration chamber, a source of compressed air, a second inlet in fluid communication with the source of compressed air, and an outlet in fluid communication with said gas intake chamber.

2. A system for cleaning an industrial dust collector in accordance with claim 1, the collecting means further comprising a flexible suction hose coupled with said venturi first inlet.

3. A system for cleaning an industrial dust collector in accordance with claim 1, wherein the industrial dust collector has a passageway between the filtration chamber and the gas intake chamber, and wherein said venturi is mounted in said passageway.

4. A system for cleaning an industrial dust collector in accordance with claim 3, wherein said venturi is mounted in the passageway with said first and second venturi inlets positioned within the filtration chamber, and with said venturi outlet positioned in the said gas intake chamber.

5. An industrial dust collector comprising a gas intake chamber including a gas inlet, a filtration chamber having a gas outlet, a set of air filter bags having filtering surfaces, said bags being mounted within said filtration chamber with the bag filtering surfaces in fluid communication with said gas intake chamber, and a system for cleaning and evacuating dust particles from said filtration chamber including means for collecting the dust particles, a source of compressed air and a venturi having an inlet in fluid communication with said filtration chamber through which the dust particles are evacuated, an outlet in fluid communication with said gas intake chamber, and a nozzle between said inlet and outlet in fluid communication with said source of compressed air.

6. An industrial dust collector in accordance with claim 5, having a passageway between said gas intake chamber and said filtration chamber, the venturi being mounted in the passageway, and a door mounted adjacent to said passageway for closing off said passageway when the venturi is removed.

7. An industrial dust collector in accordance with claim 5, wherein said collecting means includes a flexible suction hose positioned within said filtration chamber and coupled with said venturi inlet.

8. A method of cleaning the filtration chamber of an industrial dust collector having fabric filter bags mounted within the filtration chamber, the filter bags having filtering surfaces, the filtering surfaces being in fluid communication with a gas intake chamber, the method comprising the steps of evacuating dust from the filtration chamber and directing the evacuated dust into the gas intake chamber by introducing pressurized air into a venturi having an inlet in fluid communication with the filtration chamber and an outlet in fluid communication with the gas intake chamber means drawing the dust up from the filter chamber, said means connected to the suction inlet of the venturi.

9. A method of locating ruptures in the filtering surfaces of fabric filter bags mounted in the filtration chamber of an industrial dust collector with the filter bags filtering surfaces in fluid communication with a gas intake chamber and with said method comprising the steps of forcing gases from the gas intake chamber into the filtration chamber through the fabric filter bags while simultaneously evacuating dust from the filtration chamber exteriorily of the filter bags and directing the evacuated dust from the filtration chamber into the gas intake chamber, whereby evacuated dust may be forced back into the filtration chamber within the filter bags and through any bag ruptures thereby rendering such ruptures visible to an observer stationed within the filtration chamber.

10. A method of locating ruptures in fabric filter bags in accordance with claim 9, wherein said filtration chamber and said gas intake chamber are divided by a partition member having a passageway therein connecting the filtration chamber with the gas intake chamber, and wherein dust is evacuated from the filtration chamber exteriorly of the filter bag by introducing pressurized air into a venturi having an inlet in fluid communication with the filtration chamber and an outlet in fluid communication with the gas intake chamber, the venturi being positioned in said passageway.

* * * * *